US011534686B2

(12) United States Patent
Cheng

(10) Patent No.: US 11,534,686 B2
(45) Date of Patent: Dec. 27, 2022

(54) GAME CONTROL DEVICE AND GAME SYSTEM

(71) Applicant: ZEROPLUS TECHNOLOGY CO., LTD., New Taipei (TW)

(72) Inventor: Chiu-Hao Cheng, New Taipei (TW)

(73) Assignee: ZEROPLUS TECHNOLOGY CO., LTD., New Taipei (TW)

( * ) Notice: Subject to any disclaimer, the term of this patent is extended or adjusted under 35 U.S.C. 154(b) by 66 days.

(21) Appl. No.: 17/166,569

(22) Filed: Feb. 3, 2021

(65) Prior Publication Data

US 2021/0245045 A1 Aug. 12, 2021

Related U.S. Application Data

(60) Provisional application No. 62/971,414, filed on Feb. 7, 2020.

(51) Int. Cl.
*A63F 13/44* (2014.01)
*A63F 13/35* (2014.01)
(Continued)

(52) U.S. Cl.
CPC ............ *A63F 13/35* (2014.09); *A63F 13/216* (2014.09); *A63F 13/327* (2014.09); *A63F 13/40* (2014.09); *A63F 13/44* (2014.09)

(58) Field of Classification Search
None
See application file for complete search history.

(56) References Cited

U.S. PATENT DOCUMENTS

| 2009/0163280 | A1 | 6/2009 | Feng et al. |
| 2014/0364204 | A1* | 12/2014 | Tornqvist .............. A63F 13/235 463/31 |
| 2018/0012508 | A1* | 1/2018 | Sulkin .................. G09B 19/003 |

FOREIGN PATENT DOCUMENTS

| CN | 108704314 A | 10/2018 |
| TW | 497040 B | 8/2002 |
| TW | 200742601 A | 11/2007 |

OTHER PUBLICATIONS

Search report for TW110101434, dated Nov. 9, 2021, Total of 1 page.
(Continued)

*Primary Examiner* — Damon J Pierce
(74) *Attorney, Agent, or Firm* — Apex Juris, PLLC; R Wylie; Tracy Heims

(57) ABSTRACT

A game control device includes a processing module, at least one button, a signal transceiving module, a time pulse generation module, and a communication module, which are electrically connected to the processing module. When the button is pressed, the processing module generates a corresponding button code, and uses the current clocking time as absolute pressing time, and generates a button packet including a button code and a pressing time. The processing module sends the button packet via the communication module. A game system includes a server and a plurality of hosts, which are connected through the Internet. The hosts are connected to the abovementioned game control devices respectively. Each host receives the button packet sent from each game control device, and sends the button packet to the server. The server determines the press order of the each button according to the absolute pressing time in the received button packet.

15 Claims, 7 Drawing Sheets

(51) Int. Cl.
      *A63F 13/327*     (2014.01)
      *A63F 13/216*     (2014.01)
      *A63F 13/40*      (2014.01)

(56) References Cited

OTHER PUBLICATIONS

English abstract for TW497040, Total of 1 page.
English abstract for TW200742601, Total of 1 page.
English abstract for CN108704314, Total of 1 page.

\* cited by examiner

GAME CONTROL DEVICE AND GAME SYSTEM

BACKGROUND OF THE INVENTION

Technical Field

The present invention relates generally to the control of online games, and more particularly to a game control device.

Description of Related Art

With the development of network technology, online games have become popular. A conventional online game system includes a server and a plurality of hosts, wherein the hosts are connected to the server via the Internet. Each of the hosts is connected to a game control device, and users operate the game control device to control each host to play the game.

After the user presses a button of the game control device, the game control device sends a button code corresponding to the button to the host. Next, the host sends the button code to the server via the Internet. When the server receives the button code, it controls the game according to the button code.

However, when multiple users are playing online, there could be some problems since the conditions of network connection between each host and the server may be different. For example, there may be variables in network connection because the network speeds are different among the hosts, or maybe, part of the hosts are connected to the server through more network nodes. In this situation, even if two users press their respective buttons of the game control device at the same time, the receiving time of the server receiving the two button codes may also be different. Or even worse, the button code corresponding to the button which is pressed first could be received by the server later due to network latency. In this case, the fairness of the game would be affected. If the above situation happens in eSpots, the game results could be changed.

BRIEF SUMMARY OF THE INVENTION

In view of the above, the primary objective of the present invention is to provide a game control device and a game system, which make the server accurately determine the absolute pressed time of the buttons of the game control device.

The present invention provides a game control device for connected to a host with signal, including at least one button, a signal transceiving module, a time pulse generation module, and a processing module. The signal transceiving module is provided for communicating with the host and receiving a communication signal, wherein the communication signal comprises a time information a time pulse generation module for generating continuous time pulse signals. The processing module is electrically connected to the at least one button, the signal transceiving module, and the time pulse generation module; after the processing module receives the communication signal, the time information is obtained; the processing module takes the time information in the signal transceiving module as a basis to set a current time, and starts to clock according to the time pulse signal so as to generate a clocking time. After the at least one button is pressed, the processing module generates a button code correspondingly, and uses the clocking time when the at least one button is pressed as a pressing time, and generates a button packet, wherein the button packet comprises the button code and the pressing time; the processing module sends the button packet to the host via the signal transceiving module.

Additionally, the present invention provides a game system including a server, a plurality of hosts, and a plurality of game control devices; the game system is connected to the Internet for running a game program on the server-side. The plurality of hosts are cone connected to the server via the Internet, wherein the hosts run game programs on the subscriber side respectively. The plurality of game control devices communicates with the hosts respectively; each of the processing modules sends the corresponding button packet to each of the hosts through each of the signal transceiving modules. Each of the hosts sends each of the button packets to the server; the server analyzes each of the button packets to obtain the button code and the pressing time in each of the button packets; the server determines an order when the at least one button of the game control device is pressed according to the pressing time in the each obtained button packet, and controls the game according to the button code in each of the button packets.

By such design, the game control device can receive the absolute time information in the communication signal so as to generate the button packet, which makes the server accurately determine the absolute time when the button of the game control device is pressed. Thus, the fairness of the game will not be affected by network transmission delay.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
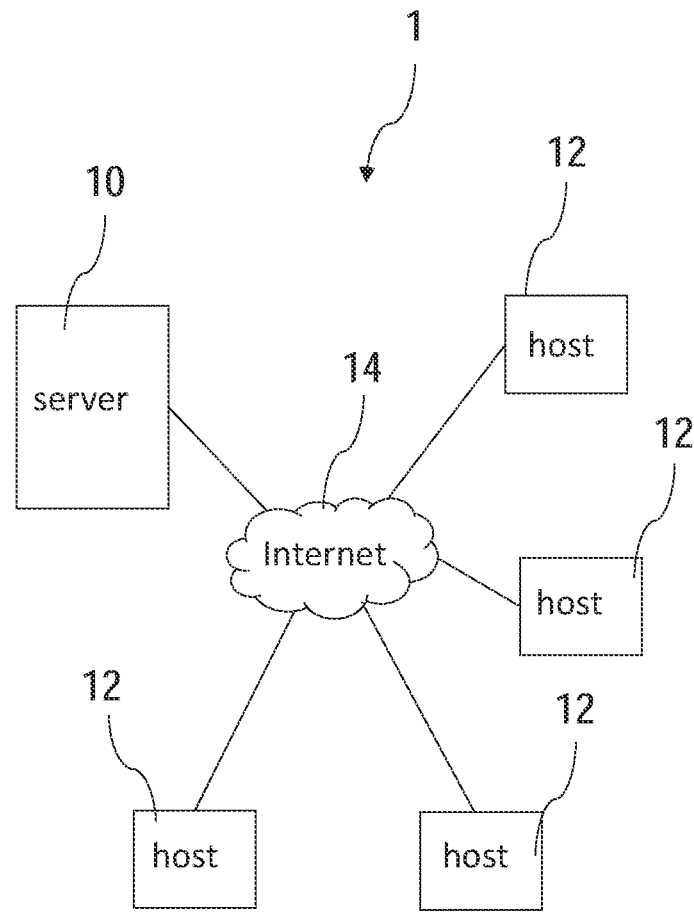
FIG. 1 is a structural diagram of the game system of the first preferred embodiment of the present invention.

As shown in FIG. 1, the first preferred embodiment of the present invention, a game system 1 includes a server 10, a plurality of hosts 12, wherein the server 10 is connected to the Internet 14 to run a game program on the server-side. In this embodiment, the hosts 12 are on the subscriber side and connected to the server 10 through the Internet 14. The hosts 12 can be personal computers, or mobile devices such as cellphones, tablet, and laptop. The hosts 12 run game programs on the subscriber side respectively. After each of the hosts 12 is connected to the server 10, each user can play online.

Figure 2:
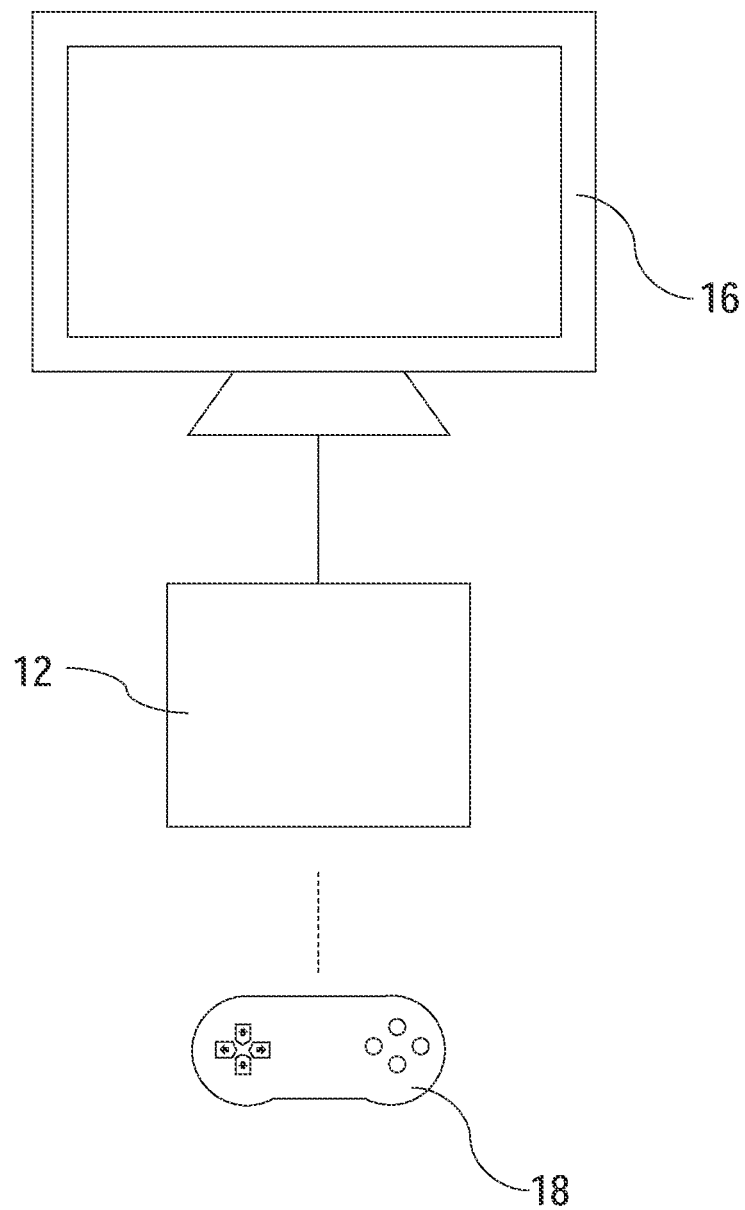
FIG. 2 is a schematic diagram of the connection between the host of the first embodiment and each of the peripherals thereof.

In this embodiment, the host 12 shown in FIG. 2 is a game console, and is connected to a screen 16 and at least a game control device 18. The at least a game control device 18 in this embodiment is at least a game controller. Each of the game control device 18 can communicate with the host 12 wirelessly or in a wired way. When the host 12 is running the game program on the subscriber side, it displays game images through the screen 16, and users can operate the game control device 18 to control the game.

Figure 3:
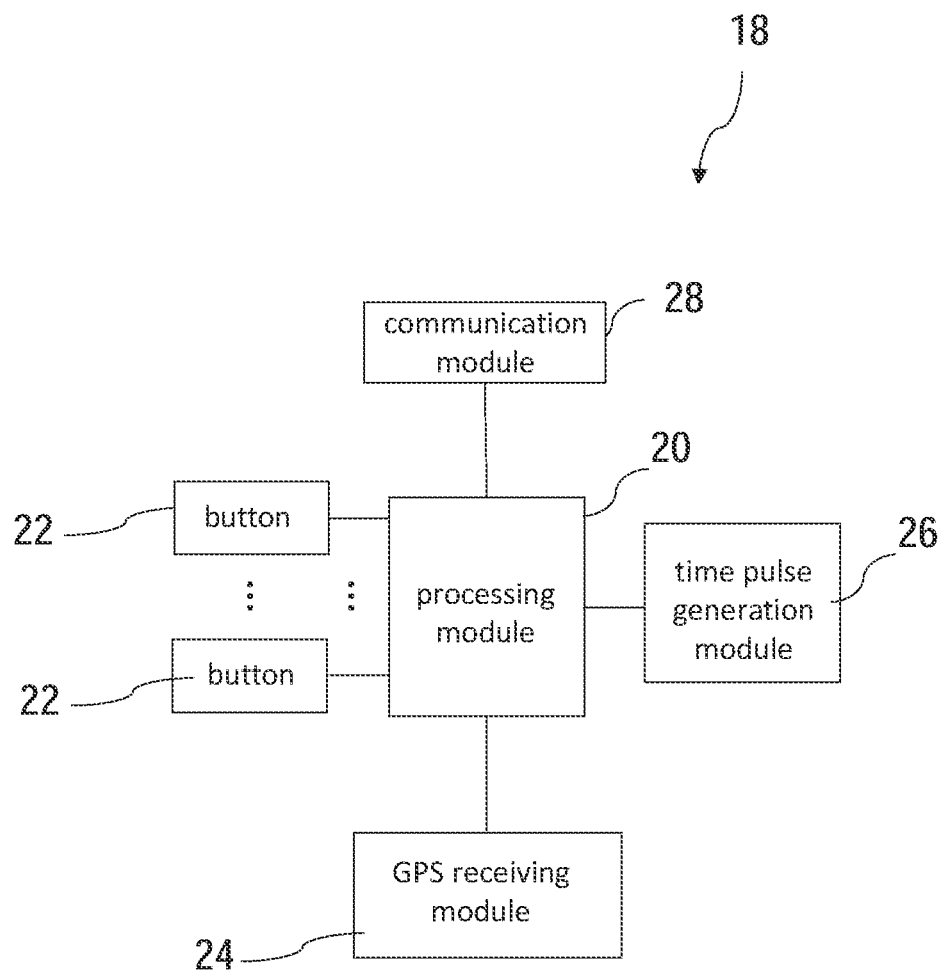
FIG. 3 is a block diagram of the game control device of the first embodiment.

As shown in FIG. 3, each game control device 18 includes a processing module 20, a plurality of buttons 22, a GPS (Global Positioning System) receiving module 24 as an example of a signal receiving module, a time pulse generation module 26, and a communication module 28. The processing module 20 is electrically connected to the buttons 22, the GPS receiving module 24, the time pulse generation module 26, and the communication module 28. The processing module 20 can be a microprocessor, a microcontroller unit (MCU), an FPGA (Field-programmable gate array), a CPLD (Complex Programmable Logic Device), or an ASIC (Application Specific Integrated Circuit), or a combination of more than one of them. The buttons 22 are provided to be pressed by users. After any of the buttons 22 is pressed, an electrical signal corresponding to the pressed button 22 is generated and then sent to the processing module 20. The buttons can be digital buttons or analog buttons (e. g., analog arrow buttons).

The GPS receiving module 24 and the communication module 28 form a signal transceiving module in this embodiment, which is provided to communicate with the host 12 and receive communication signals. In details, the GPS receiving module 24 receives satellite positioning signal as an example of the communication signal, and sends the satellite positioning signal to the processing module 20, wherein the received satellite positioning signal includes a GPS time information (i.e., time signal defined in the present invention, wherein the time signal is absolute time). The time pulse generation module 26 is provided for generating continuous time pulse signals and sending them to the processing module 20, wherein the time pulse generation module 26 can be an oscillator, such as a quartz oscillator. The communication module 28 is provided for communicating with the host 12. The communication module 28 can be a wireless or a wired communication module; the wireless communication module can be, for example, a Bluetooth communication module, a radio frequency (RF) communication module, while the wired communication module can be, for example, a USB communication interface. In this embodiment, the signal receiving module and the communication module 28 are provided to receive different signals respectively.

The processing module 20 can start the GPS receiving module 24, which makes the GPS receiving module 24 search satellite positioning signal. After the GPS receiving module 24 receives the satellite positioning signal, it sends the satellite positioning signal to the processing module 20. After the processing module 20 receives the satellite positioning signal and obtains the GPS time information, the processing module 20 sets the current time based on the GPS time information, and moreover, starts to clock according to the time pulse signals generated by the time pulse generation module 26, so as to generate a clocking time. After finishing positioning, the GPS receiving module 24 can send out a pulse signal per second; when the processing module 20 receives the pulse signal, the current time would be corrected once according to the received GPS time information. Or alternatively, every time when the processing module 20 receives the GPS time information, the current time is corrected, which can reduce time error caused by clocking that relies only on the time pulse signals.

After any of the buttons 22 is pressed, the processing module 20 generates a button code correspondingly, and uses the current clocking time as a pressing time, and furthermore, generates a button packet which includes the button code and the pressing time. The processing module 20 sends the button packet to the host 12 through the communication module 28, and the host 12 sends the button packet to the server 10. Next, the server 10 will resolve the button packet to obtain the button code and the pressing time, and then set the pressing time as the time when the user presses the button.

The processing module 20 can start the GPS receiving module every time, or alternatively, a user can press one specific button 22 or a combination of more than one specific buttons 22 to trigger the processing module 20 to start the GPS receiving module 24, which saves electricity consumption. After the GPS receiving module 24 receives satellite positioning signal, the processing module 20 can disable the GPS receiving module 24 until the next predetermined time, or until a user presses a specific button 22 or a combination of buttons 22. For example, when a user takes the game control device 18 to a place where the game control device 18 can receive satellite positioning signal, e. g., outdoor spaces, the user can press one specific button 22 or a combination of more than one specific buttons 22 to trigger the processing module 20 to start the GPS receiving module 24 to receive satellite positioning signal, so that the processing module 20 can correct the clocking time.

Because the GPS time information is transmitted by satellite, even if the users of the game control devices 18 are located in different regions, the GPS time information received by the GPS receiving modules 24 of the game control devices 18 is uniform. Thus, when multiple users are playing online with multiple hosts 12, the server 10 can determine the timing of pressing button 22 of each user according to the pressing times in the button packets sent from the hosts 12, so as to control the game. From the above, each pressing time received by the server 10 is generated by the game control device 18 after the clocking time is corrected according to the GPS time information. Therefore, even if the time when the server 10 receives the button packets from the hosts 12 are different because the network speeds are different among the hosts 12, after the server 10 resolves each button packet and obtains each pressing time, the server 10 can determine the timing of pressing button of each user. In this way, the game will be fairer.

Figure 4:
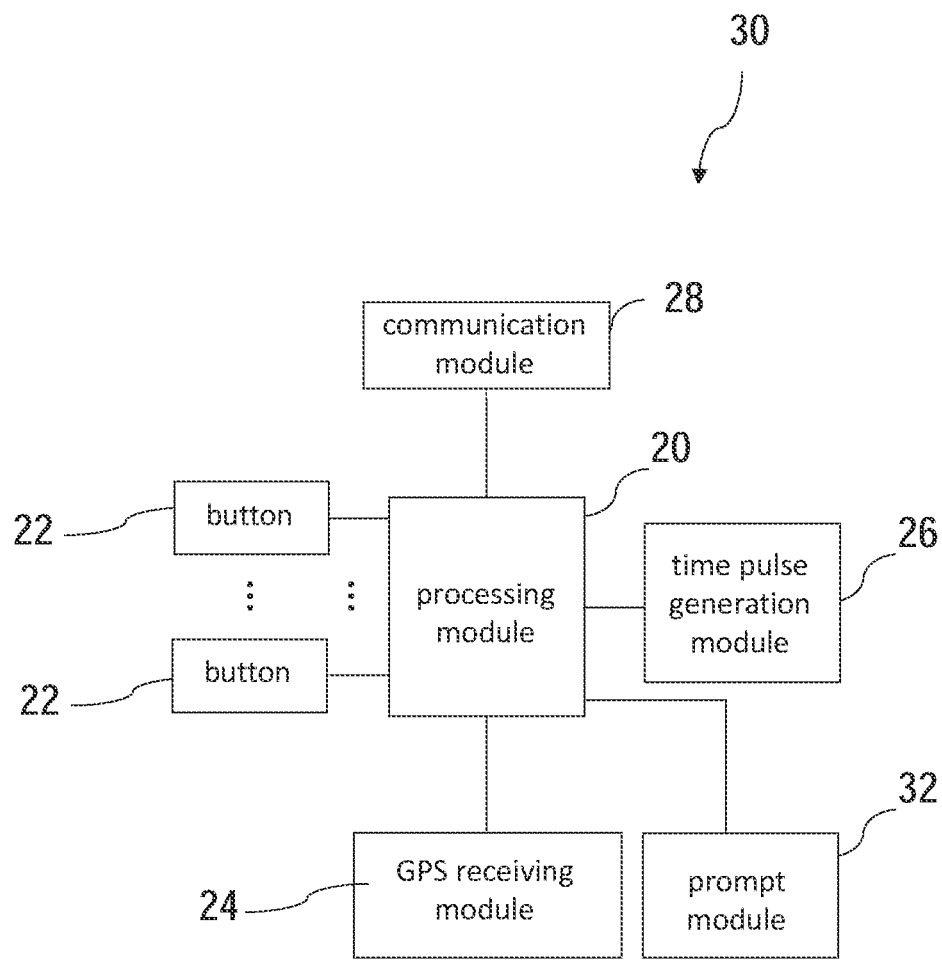
FIG. 4 is a block diagram of the game control device of the second preferred embodiment.

As illustrated in FIG. 4, the second preferred embodiment of the present invention, a game control device 30, is based on the game control device 18, and further includes a prompt module 32 which is electrically connected to the processing module. The prompt module 32 can include a light source such as LED, or include a buzzer. The processing module 20 starts to count time when correcting the clocking time. Moreover, if the processing module 20 has not received satellite positioning signal when the counted time reaches a predetermined time, the processing module 20 will control the prompt module 32 to send a prompting message, for example, make the light source light or flash, or make the buzzer sound, which reminds users to move the game control device 18 to a place where satellite positioning signal can be received, so as to trigger the processing module 20 to start the GPS receiving module 24 for receiving satellite positioning signal, so that the processing module 20 can correct the clocking time.

Figure 5:
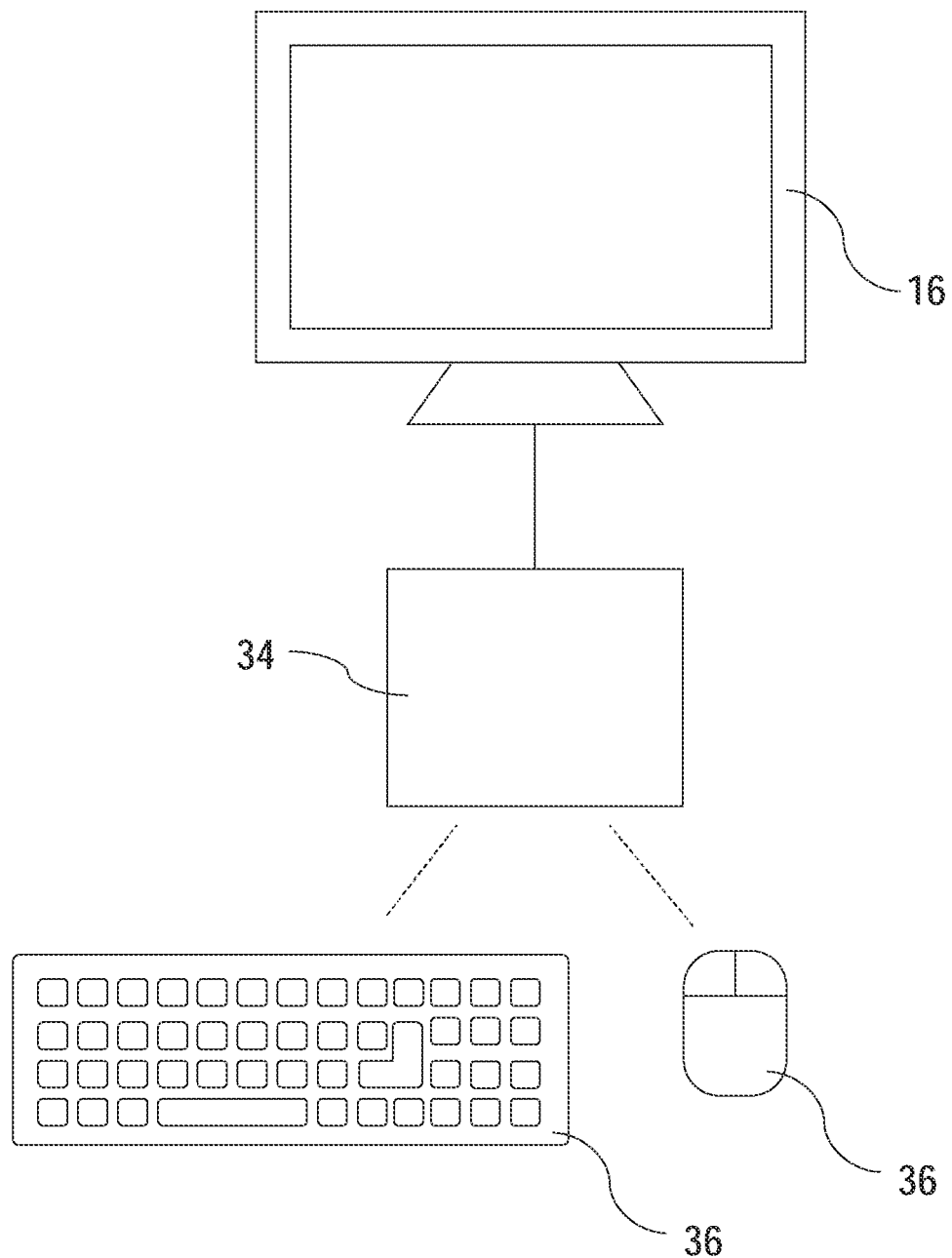
FIG. 5 is a schematic diagram of the connection between the host of the third embodiment and each of the peripherals thereof.

As shown in FIG. 5, the host 34 in the third embodiment is a personal computer host. The number of the game control device 36 is multiple, and the game control devices 36 in this embodiment are a mouse and a keyboard. The structure of the game control device 36 is the same as the structure of the game control device 18 in the first embodiment.

Figure 6:
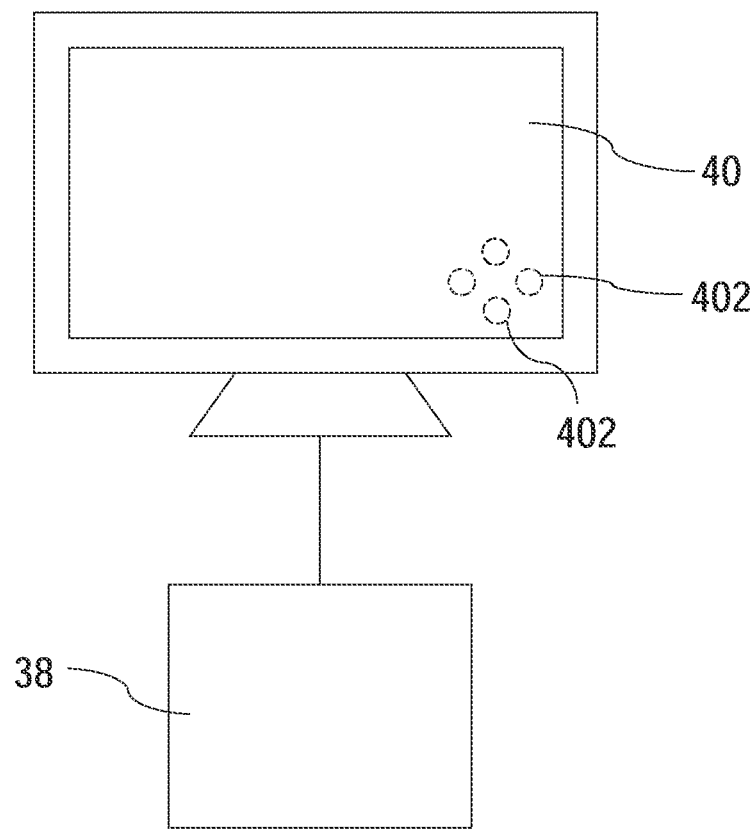
FIG. 6 is a schematic diagram of the connection between the host of the fourth embodiment and each of the peripherals thereof.

As shown in FIG. 6, the host 38 in the fourth embodiment can be a computer host or a game console, wherein the host 38 is connected to a touch screen 40. In this embodiment, the touch screen 40 forms the game control device. In addition, the structure of the touch screen 40 is roughly the same as the game control device in the first embodiment, the difference is that at least a touch area 402 on the touch screen 40 is used as at least a virtual button. When users tap the touch area 402, the processing module 20 sends a packet corresponding to the touch area 402 to the host 38 through the communication module 28.

Figure 7:
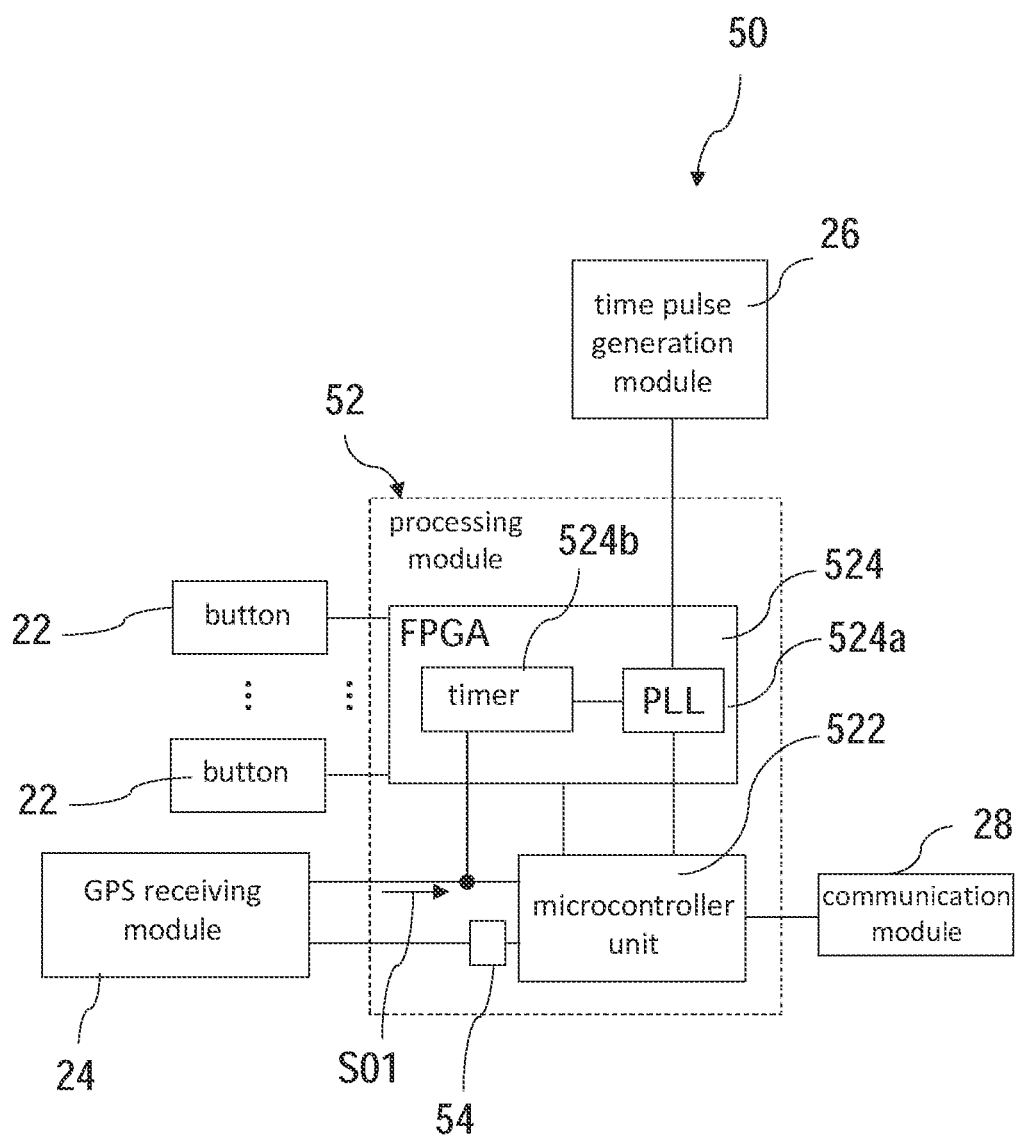
FIG. 7 is a block diagram of the game control device of the fifth preferred embodiment.

As illustrated in FIG. 7, the structure of the game control device 50 in the fifth embodiment is roughly the same as the structure of the game control device 18 in the first embodiment. The difference is that the processing module 52 in this embodiment includes a microcontroller unit 522 and a FPGA 524 as an example of logic element, wherein the microcontroller unit 522 and the FPGA 524 are electrically connected. The microcontroller unit 522 is electrically connected to the GPS receiving module 24 and the communication module 28. The FPGA 524 is electrically connected to the time pulse generation module 26 and the buttons 22. The time pulse signal generated by the time pulse generation module 26 is sent to the FPGA 524, and then passes through Phase-locked loops (PLL) 524a within the FPGA 524, and finally output to a timer 524b and the external microcontroller unit 522 as the time pulses for the operation of the timer 524b and the microcontroller unit 522. Because the time pulse signal is output after passing through the PLL 524a, noise jamming in the time pulse signal which is output to the timer 524b and the microcontroller unit 522 can be reduced.

The working steps of the game control device 50 are as follows:

The microcontroller unit 522 resets the FPGA 524 through, for example, I2C or I/O interface.

Through a transmission interface 54 such as Universal Asynchronous Receiver/Transmitter (UART), the microcontroller unit 522 controls the GPS receiving module 24 to receive satellite positioning signal, as well as to output a pulse signal S01 which is periodic, e. g., one pulse per second, wherein the duty cycle can be set by the microcontroller unit 522 through the transmission interface. Additionally, the type of the packet and the baud rate, which are output from the GPS receiving module 24 can be set through the transmission interface 54. The pulse signal S01 will be output to the FPGA 524 and the microcontroller unit 522.

The microcontroller unit 522 will check a Valid field in the packet output from the GPS receiving module 24 to determine whether the GPS receiving module 24 has received satellite positioning signal.

If the microcontroller unit 522 confirms that the GPS receiving module 24 receives satellite positioning signal, the packet output from the GPS receiving module 24 includes the GPS time information. Before the next pulse following the pulse signal S01 is generated, the microcontroller unit 522 sends the GPS time information to the FPGA 524 through, for example, I2C. The FPGA 524 then sets or corrects the current time of the timer 524b based on the GPS time information. Moreover, according to the time pulse signals generated by the time pulse generation module 26, the FPGA 524 starts to clock and generates a clocking time. In this embodiment, when the processing module 52 receives the pulse signal S01, current time correction can be performed once.

Before the buttons 22 are detected, the microcontroller unit 522 sends a set detection command to the FPGA 524 via, for example, I2C, so that the FPGA 524 starts to detect the buttons.

If the buttons 22 to be detected are digital buttons, after any of the buttons 22 is pressed, the FPGA 524 sends a press state to the microcontroller unit 522. At the same time, the FPGA 524 uses the clocking time when the button 22 is pressed as a pressing time, and stores the button code and the pressing time of the pressed button 22 into a register within the FPGA. Next, the microcontroller unit 522 reads the content in the register so as to obtain the button code and the pressing time of the pressed button 22, as well as generates a button packet correspondingly, and finally sends the button packet to the host 12 through the communication module 28.

If the buttons 22 to be detected are analog buttons, the FPGA 524 periodically sends a press state to the microcontroller unit 522. At the same time, the FPGA 524 uses the clocking time when the button 22 is pressed as a pressing time, and periodically stores the button code and the pressing time of the pressed analog button into a register within the FPGA. When the microcontroller unit 522 receives the press state, the microcontroller unit 522 reads analog values of an analog-to-digital converter (ADC) in the FPGA 524 as well as the content in the register, and then generates a button packet correspondingly, wherein the button packet includes the button code, the pressing time, and the values of the pressed analog button 22. The microcontroller unit 522 sends the button packet to the host 12 through the communication module 28.

The game control device of each embodiment described above can include only one button 22. Moreover, the signal transceiving module can also receive other communication signals containing time information. For example, when the host is connected to the Internet wirelessly or in a wired way, the host obtains the time information of the Internet; when the signal transceiving module communicates with the host, the host regularly sends the communication signal containing time information to the signal transceiving module of the game control device. In other embodiments, the host can also include a GPS receiving module for receiving GPS time information in satellite positioning signal, and the host sends the communication signal containing GPS time information to the signal transceiving module of the game control device.

In an embodiment, the signal transceiving module of the game control device can also receive other wireless signals, such as Wi-Fi signal or mobile network signal. Furthermore, the processing module can obtain the time information in the Wi-Fi signal or mobile network signal.

From the above, by the signal transceiving module provided on the game control device, the server can accurately determine the absolute time when the buttons of the game control device are pressed. Thus, the fairness of the game will not be affected by network transmission delay.

The embodiments described above are only preferred embodiments of the present invention. All equivalent structures which employ the concepts disclosed in this specification and the appended claims should fall within the scope of the present invention.

What is claimed is:

1. A game control device for connected to a host with signal, comprising:
    at least one button;
    a signal transceiving module for communicating with the host and receiving a communication signal one after another, wherein the communication signal comprises a time information;
    a time pulse generation module for generating a continuous time pulse signal;
    a processing module electrically connected to the at least one button, the signal transceiving module, and the time pulse generation module; when the processing module receives the communication signal, the time information is obtained; the processing module takes the time information in the signal transceiving module as a basis to set a current time, and starts to clock according to the time pulse signal so as to generate a clocking time;
    after the at least one button is pressed, the processing module generates a button code correspondingly, and uses the clocking time when the at least one button is pressed as a pressing time, and generates a button packet, wherein the button packet comprises the button code and the pressing time; the processing module sends the button packet to the host via the signal transceiving module.

2. The game control device of claim 1, wherein the communication signal received by the signal transceiving module is a wireless signal.

3. The game control device of claim 2, wherein the signal transceiving module comprises a communication module and a signal receiving module; the communication module communicates with the host, and the processing module sends the button packet to the host via the communication module; the signal receiving module receives the wireless signal.

4. The game control device of claim 3, wherein the signal receiving module is a GPS receiving module, and the communication signal received by the GPS receiving module is a satellite positioning signal.

5. The game control device of claim 4, wherein the processing module sets the current time when the time information is obtained.

6. The game control device of claim 4, wherein the processing module can control the GPS receiving module to start or stop; the processing module controls the GPS receiving module to start every predetermined time.

7. The game control device of claim 4, wherein the at least one button comprises a plurality of buttons; when a specific one button or a combination of buttons are pressed, the processing module starts the GPS receiving module.

8. The game control device of claim 4, further comprising a prompt module which is electrically connected to the processing module; the processing module starts to clock when generating the clocking time; if the processing module has not received the satellite positioning signal when counted time reaches a predetermined time, the processing module will control the prompt module to send a prompting message.

9. The game control device of claim 4, wherein the processing module comprises a microcontroller unit and a logic element, which are electrically connected; the microcontroller unit is electrically connected to the GPS receiving module and the communication module, and the logic element is electrically connected to the time pulse generation module and the at least one button; the logic element comprises a Phase-locked loop and a timer, and the time pulse signal is output to the timer through the Phase-locked loop; the microcontroller unit controls the GPS receiving module to output a GPS pulse signal which is periodic; before a pulse of the GPS pulse signal is generated, the microcontroller unit sends the time information to the logic element, and the logic element sets the current time of the timer based on the time information, and generates the clocking time.

10. The game control device of claim 9, wherein the time pulse signal is output to the microcontroller unit via the Phase-locked loop as a time pulse of operation of the microcontroller unit.

11. The game control device of claim 9, wherein the microcontroller unit checks a Valid field in the button packet outputted from the GPS receiving module to determine whether the GPS receiving module has received the satellite positioning signal.

12. The game control device of claim 9, wherein the at least one button is a digital button; after the at least one button is pressed, the logic element sends a press state to the microcontroller unit, and the logic element uses the clocking time when the at least one button is pressed as the pressing time, and stores the button code of the at least one button and the pressing time into a register; the microcontroller unit reads a content in the register so as to obtain the button code and the pressing time of the pressed at least one button, as well as generates the button packet correspondingly; the microcontroller unit sends the button packet to the host through the communication module.

13. The game control device of claim 9, wherein the at least one button is an analog button; the logic element sends a press state to the microcontroller unit periodically; the logic element uses the clocking time when the at least one button is pressed as the pressing time, and periodically stores the button code and the pressing time of the pressed at least one button into a register; when receiving the press state, the microcontroller unit reads a value of an analog-to-digital converter within the logic element as well as a content in the register, and then generates the button packet correspondingly, wherein the button packet comprises the button code, the pressing time, and the values of the pressed at least one button; the microcontroller unit sends the button packet to the host through the communication module.

14. A game system, comprising:
    a server connected to the Internet for running a game program on the server-side;
    a plurality of hosts which are cone connected to the server via the Internet, wherein the hosts run game programs on a subscriber side respectively;
    a plurality of game control devices communicating with the hosts respectively, wherein each of the game control devices comprises at least one button, a signal transceiving module, a time pulse generation module, a processing module; the signal transceiving module is adapted to communicate with the host and receive a communication signal one after another; the communication signal comprises a time information; the time pulse generation module is adapted to generate a continuous time pulse signal; the processing module is electrically connected to the at least one button, the signal transceiving module, and the time pulse generation module; whenever the processing module receives the communication signal, the time information is obtained; the processing module takes the time information in the signal transceiving module as a basis to set a current time, and starts to clock according to the time pulse signal so as to generate a clocking time; after the at least one button is pressed, the processing module generates a button code correspondingly, and uses the clocking time when the at least one button is pressed as a pressing time, and generates a button packet, wherein the button packet comprises the button code and the pressing time; the processing module sends the button packet to the host via the signal transceiving module; each of the processing modules sends the corresponding button packet to each of the hosts through each of the signal transceiving modules;

wherein, each of the hosts sends each of the button packets to the server; the server analyzes each of the button packets to obtain the button code and the pressing time in each of the button packets; the server determines an order when the at least one button of the game control device is pressed according to the pressing time in the each obtained button packet, and controls the game according to the button code in each of the button packets.

15. A game control device for connected to a host with signal, comprising:
at least one button;
a signal transceiving module for communicating with the host and receiving a communication signal, wherein the communication signal comprises a time information;
a time pulse generation module for generating a continuous time pulse signal;
a processing module electrically connected to the at least one button, the signal transceiving module, and the time pulse generation module; after the processing module receives the communication signal, the time information is obtained; the processing module takes the time information in the signal transceiving module as a basis to set a current time, and starts to clock according to the time pulse signal so as to generate a clocking time;
after the at least one button is pressed, the processing module generates a button code correspondingly, and uses the clocking time when the at least one button is pressed as a pressing time, and generates a button packet, wherein the button packet comprises the button code and the pressing time; the processing module sends the button packet to the host via the signal transceiving module;
wherein the communication signal received by the signal transceiving module is a wireless signal;
wherein the signal transceiving module comprises a communication module and a signal receiving module; the communication module communicates with the host, and the processing module sends the button packet to the host via the communication module; the signal receiving module receives the wireless signal;
wherein the signal receiving module is a GPS receiving module, and the received communication signal is a satellite positioning signal.

\* \* \* \* \*